United States Patent Office 3,608,433
Patented Sept. 28, 1971

3,608,433
VALVE ARRANGEMENT IN THE WORKING PISTON OF A PRESSURE-MEDIUM OPERATING CYLINDER
Dirk Buisman, Leichlingen, and Otto Lattner, Stuttgart-Bad, Germany, assignors to Daimler-Benz Aktiengesellschaft, Stuttgart-Unterturkheim, Germany
Filed Apr. 11, 1969, Ser. No. 815,307
Claims priority, application Germany, Apr. 13, 1968,
P 17 50 263.5
Int. Cl. F15b 15/22
U.S. Cl. 91—401          18 Claims

ABSTRACT OF THE DISCLOSURE

A valve mechanism arranged in an operating piston slidable within a cylinder, in which the operating piston is provided with a valve channel forming a guide portion, and a valve pin axially displaceable in the guide portion which includes a center section adapted to be guided and sealed pressure-tight in the guide portion and end sections of reduced cross section with respect to the center section.

The present invention relates to a valve mechanism in the operating or working piston of a pressure-medium operating cylinder, with a valve channel extending parallelly to the cylinder axis which terminates in the operating pressure spaces on both sides of the operating piston and which is opened within the range of the piston end positions whereas it is closed in the mid-piston positions.

With a known valve mechanism of this type (U.S. Pat. 2,403,325), the operating piston is subdivided radially into two piston halves which are each provided with a coaxial valve channel stepped or offset in the diameter. Two valve balls are arranged in the two abutting, wide channel sections; a valve spring is supported between the two balls. The valve balls each close the adjacent narrower channel section. By means of internal housing abutments, valve plungers or push-rods arranged in the narrower channel sections are actuated in the direction from the piston end faces for the purpose of lifting off of the valve balls. This known valve mechanism, however, is costly because a separate valve ball as well as an additional plunger or push rod has to be provided for each work space. Furthermore, disadvantageous with such prior art device is the fact that a valve spring is necessary and the operating piston has to be subdivided so that additional means have to be provided for sealing the piston parts. For the purpose of exchange and cleaning of the valve parts, the prior art operating piston has to be disassembled.

The present invention aims at producing a valve mechanism of the aforementioned type which does not possess the disadvantages mentioned above. For that purpose, a valve mechanism is proposed according to the present invention in which the valve channel is provided with a guide portion having a constant cross section and a rod-shaped valve pin axially fixed in the operating cylinder and arranged parallel to the cylinder axis extends through the valve channel, and in which the valve pin is form-lockingly guided essentially over its entire length in the guide portion and is also axially displaceable relative to the operating piston as well as including a center section and two end sections whereby the cross section of the end sections is smaller than the cross section of the guide portion of the valve channel whereas the center section upon engagement in the guide portion, is sealed pressure-tight with respect to the operating piston.

The valve mechanism according to the present invention consists only of a valve pin as well as of a valve channel and therefore excels by a simple construction and high operating reliability. The cross section of the valve pin can be constructed as throttling cross section so that also a partial pressure decrease can be achieved in the cylinder space which is under the operating pressure instead of a complete pressure equalization. This type of construction of the valve mechanism according to the present invention is advantageous in particular with servo-steering systems in which also with a fully deflected steering wheel, a reduced auxiliary force assist is still desirable in order that the manual forces dot not become excessively large.

The beginning or initiation of the hydraulic stroke limitation effected by the valve mechanism can take place at different distances with respect to the center position for the two directions of piston movement if the two end sections of the valve pin have unequal spacings from the mentioned center position. Such a valve mechanism is suited for the servo-steering systems with unequal steering geometry. Both for the left as also for the right-hand steering, the same valve pin can be utilized by a mere reversal thereof in its installed position.

The characteristics of the hydraulic stroke limitation can be changed in the mechanism of the present invention by a simple exchange of the valve pin.

The cross sectional decrease of the end sections of the valve pin with respect to the cross section of the valve channel can also be achieved in that the cross section of each end section is constructed star-shaped. The star arms then serve for the guidance of the valve pin. However, it is also feasible within the scope of the present invention that the end section of the bolt-shaped valve pin is provided with two diametrically opposite longitudinal grooves for the opening of the valve channel whereby the cylindrical circumferential surfaces of the end section serve for the guidance of the valve pin.

With a structurally particularly simple type of construction of the mechanism according to the present invention, the valve pin can be held radially in the operating cylinder exclusively by the operating piston and can support itself axially in one direction at a housing shoulder and in the other direction at an end face housing cover.

An effective ventilation of the operating cylinder during the start of the operation can be achieved in that the valve channel is arranged in the installed position of the operating cylinder, in the uppermost portion of the working piston. In that case, during the opening of the valve channel in the upper end position of the operating piston with an inclined cylinder position, the uppermost portion of both pressure medium spaces are connected with a return line.

These and further objects, features, and advantages of the present invention will become more obvious from the following description when taken in connection with the accompanying drawing which shows, for purposes of illustration only, several embodiments in accordance with the present invention, and wherein.

Figure 1:
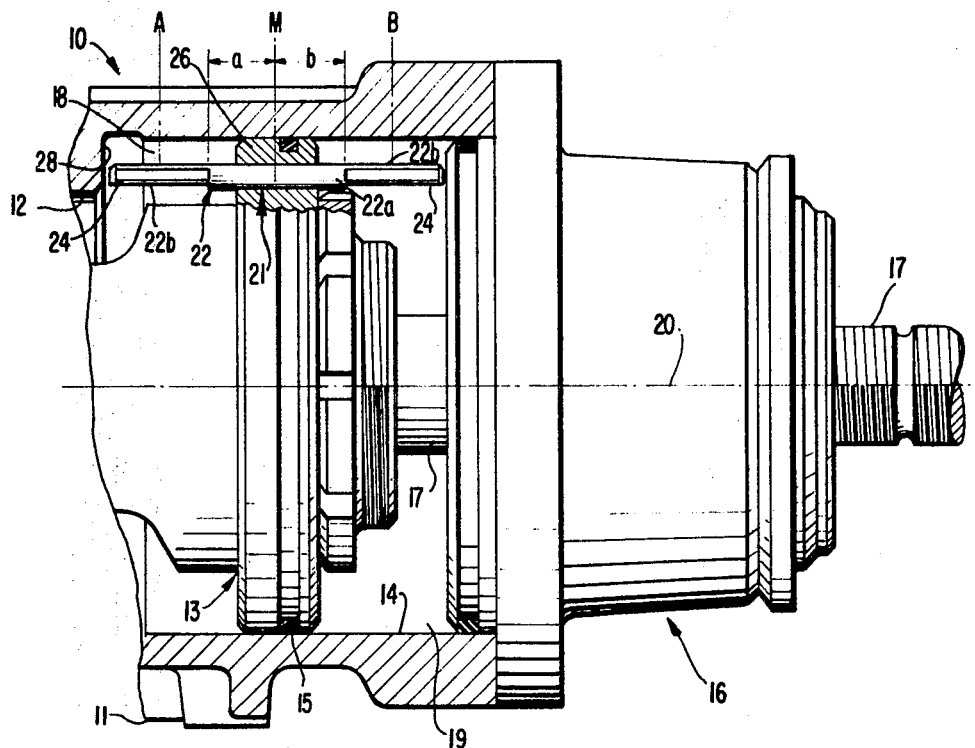
FIG. 1 is a partial view of a steering gear for a servo-steering system, partially in longitudinal cross section, with a valve mechanism in accordance with the present invention.
Figure 2:
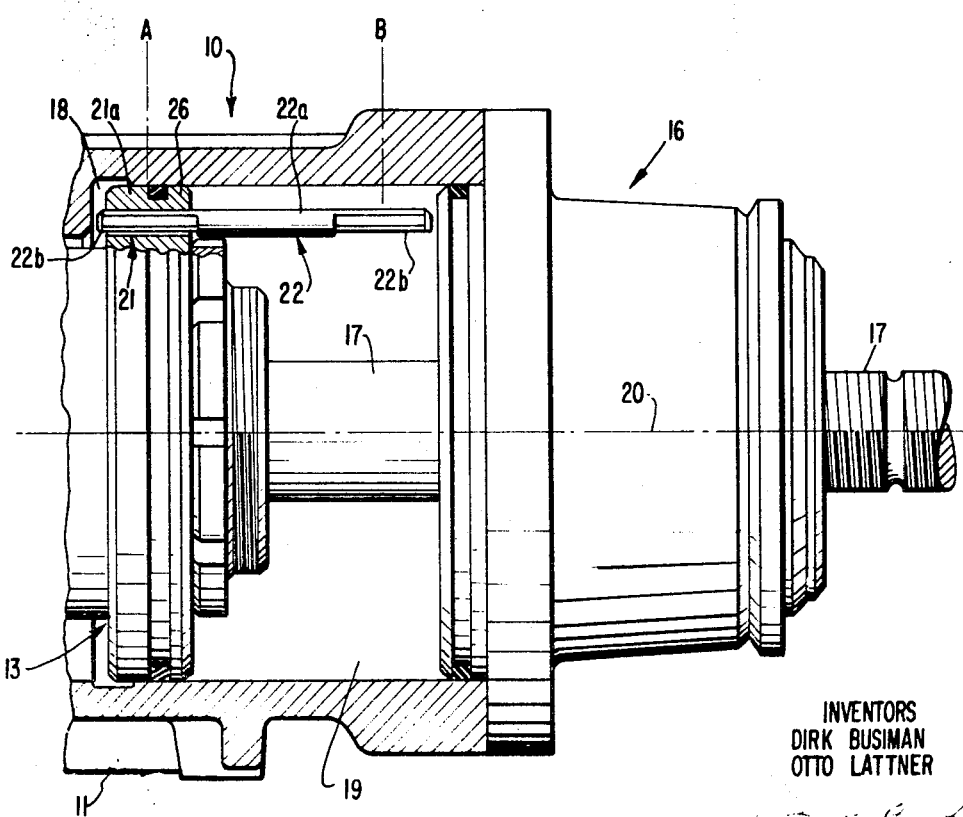
FIG. 2 is a view, similar to FIG. 1, with the operating piston thereof in another position.
Figure 3:
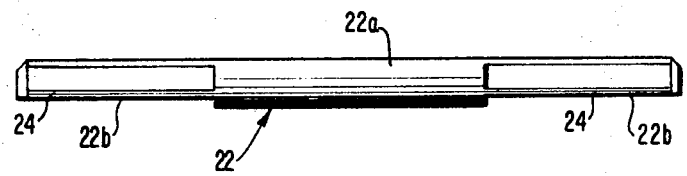
FIG. 3 is an elevational view on a valve pin in accordance with the present invention.

Referring now to the drawing, wherein like reference numerals are used throughout the various views to designate like parts, and more particularly to FIGS. 1 and 2, reference numeral 10 generally designates therein a steering gear whose housing 11 is constructed as pressure medium cylinder offset in its diameter. The narrow cylinder section 12 serves conventionally for the guidance of the operating piston generally designated by refernce numeral 13 which is sealed with respect to the wide cylinder section 14, by a conventional seal 15. The wide cylinder section 14 is closed in a pressure-tight manner by an end-face housing cover 16 in which a steering spindle part 17 is rotatably and axially non-displaceably supported. The steering spindle part 17 is connected with the operating piston 13 in a conventional manner so as to be spirally movable; the working piston 13, in its turn, is operatively connected in a conventional manner (not shown) with the steering shaft. The working spaces 18 and 19 on the two sides of the operating piston 13 may be connected by way of a control valve of conventional construction (not shown) with either an operating pressure source or with a pressure relieved or vented space. Depending on the steering deflection of the spindle part 17, one of the two working spaces is connected with the operating source and the other with the pressure-relieved space.

Figure 4:
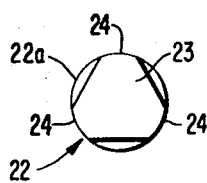
FIG. 4 is a end view of the valve pin of FIG. 3.
Figure 5:
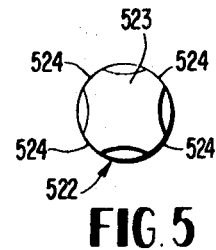
FIG. 5 is an end view, similar to FIG. 4, of a second embodiment of a valve pin in accordance with the present invention.
Figure 6:
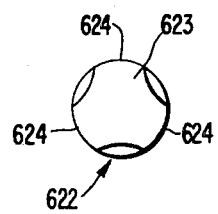
FIG. 6 is an end view, similar to FIG. 4, of a third embodiment of a valve pin in accordance with the present invention.

A valve channel generally designated by reference numeral 21 extends parallel to the cylinder axis 20 within the operating piston 13. The valve channel 21 terminates in the working spaces 18 and 19. A valve pin generally designated by reference numeral 22 extends through the valve channel 21; the valve pin 22 is supported axially in one direction at a housing shoulder 28 and in the other direction at the housing cover 16 and is axially fixed in this manner within the housing 11. The valve pin 22 is provided with a center section 22a having a circular cross section and with two ends sections 22b having a star-shaped cross section 23 (FIG. 4).

In the type of construction of the valve pin 22 illustrated in FIG. 1, the two end sections 22b thereof have the same distances a and b from the center position of the operating piston 13 indicated by reference character M. Consequently, the hydraulic stroke limitation for the operating piston 13 starts in each case after steering wheel deflections that are equal in amount but oppositely directed. With a dissimilar or unequal steering geometry of a vehicle, valve pins can be utilized in which the distances a and b are not equal. With these steering systems, the same valve pins can be utilized for both right-hand and also left-hand steering systems whereby the valve pin is inserted in the steering gear housing of the right-hand steering in a reverse position with respect to its installed position for a left-hand steering system.

In FIG. 2, the operating piston 13 is indicated in the left end position A in which the valve channel 21 is opened by an end section 22b of the valve pin 22. A more or less strong throttling of the pressure medium flowing off out of the working space subjected to working pressure (in FIG. 2 the space 19) can be achieved by the extent of the cross-sectional reduction in the end section 22b with respect to the channel cross section of the guide portion 21a. Consequently, the operating piston 13 exerts also in the area of this end position an auxiliary force. In the application of the described embodiment to a servo-steering system, the necessary manual forces are then not excessively large also with a complete or full steering deflection or while driving through the smallest turning radius.

Figure 7:
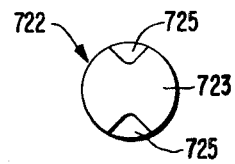
FIG. 7 is an end view, corresponding to FIG. 4, of a fourth embodiment of a valve pin in accordance with the present invention.

The valve pins 22, 522, and 622 illustrated in FIGS. 1 through 6 have each end sections with star-shaped cross sections 23, 523 and 623, respectively, whereby the cylindrical outer surfaces 24, 524 and 624 of the star arms serve for the form-locking guidance of the valve pin 22 in the guide portion 21a of the valve channel 21. The full circular cross-section 723 of the valve pin 722 is reduced within the area of an end section by the cross section of two longitudinal grooves 725 (FIG. 7).

Figure 8:
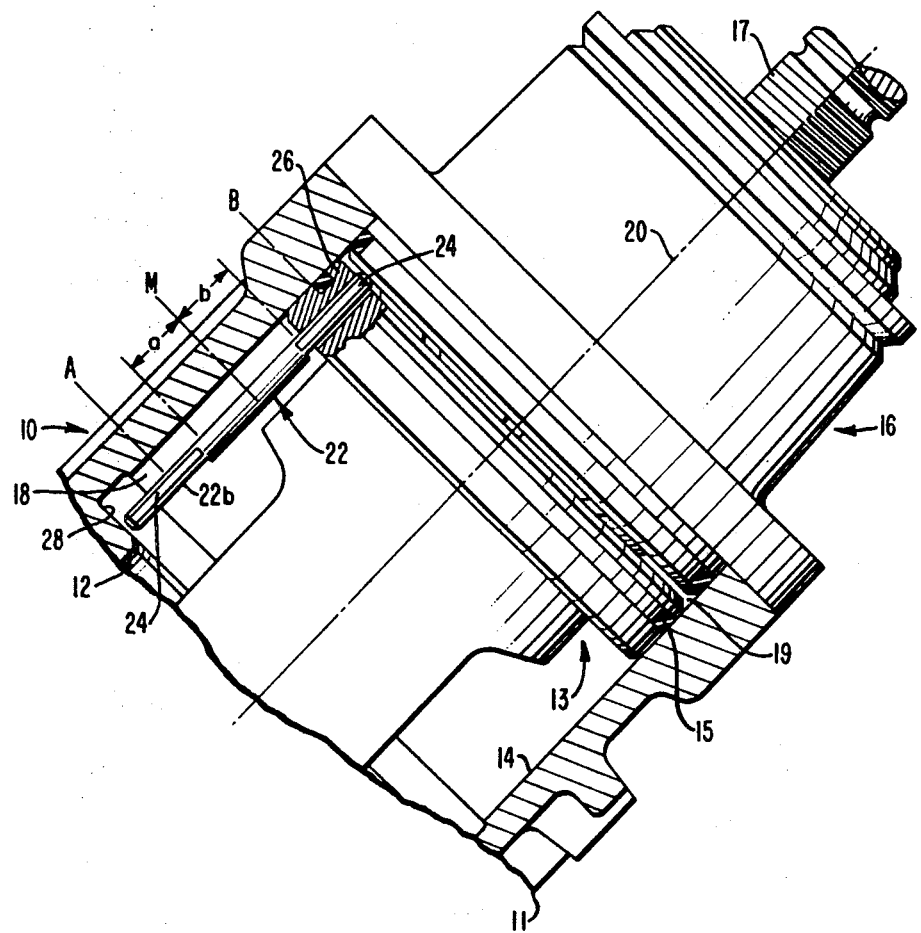
FIG. 8 is a view similar to FIG. 1 with the steering gear in the installed position in the vehicle.

The valve pin 22 is arranged in the upper portion 26 of the operating piston 13 in relation to the axis 20 which is inclined in the installed position, as shown in FIG. 8, so that all spaces of the housing 11 in the upper piston end position A or B are also effectively vented during the initial start of the operation of the steering gear by way of the respectively open return line at the control valve.

The characteristics of the valve mechanism in accordance with the present invention can be readily changed by a simple exchange of the valve pin.

While we have shown and described only several embodiments in accordance with the present invention, it is understood that the same is not limited thereto but is susceptible of numerous changes and modifications as known to a person skilled in the art and we therefore do not wish to be limited to the details shown and described herein but intend to cover all such changes and modifications as are within the scope of those skilled in the art.

We claim:

1. A valve mechanism in an operating piston of a pressure medium operating cylinder, provided with a valve channel in the piston extending substantially parallel to an axis of the cylinder and terminating on both sides of the operating piston in operating pressure spaces and is opened within the range of end positions of the piston while being closed in the mid-piston positions characterized in that the valve channel is provided with a guide portion of substantially constant cross-section, and rod-shaped valve pin means axially fixed in the operating cylinder and arranged substantially parallel to the cylinder axis, said valve pin means extending through the valve channel and being form-lockingly guided essentially over its entire length in the guide portion formed by the valve channel and being also axially displaceable relative to the operating piston, said valve pin means having a center section and two end sections, the cross-section of the end sections being smaller than the cross-section of the guide portion of the valve channel whereas the center section of the valve pin means is sealed in a substantially pressure-tight manner with respect to the operating piston during engagement in the guide portion.

2. A valve mechanism according to claim 1, characterized in that the end sections have different distances from the operating piston when in the center position thereof.

3. A valve mechanism according to claim 2, characterized by a star-shaped cross section of an end section of the valve pin means.

4. A valve mechanism according to claim 2, wherein an end section of the valve pin means is provided with two longitudinal grooves.

5. A valve mechanism according to claim 4, wherein the longitudinal grooves are disposed diametrically opposite.

6. A valve mechanism according to claim 3, wherein the arms of the star-shaped end sections of the valve pin means are substantially symmetrically disposed about the circumference.

7. A valve mechanism according to claim 1, wherein the valve pin means is adapted to be supported in one direction against a housing shoulder formed in the operating cylinder and in the other direction against a housing cover means at the end face of a steering gear.

8. A valve mechanism according to claim 7, wherein the valve channel is arranged in the uppermost portion of the operating piston in the position of the operating cylinder installed in a vehicle.

9. A valve mechanism according to claim 8, characterized in that the end sections have different distances from the operating piston when in the center position thereof.

10. A valve mechanism according to claim 8, characterized by a star-shaped cross section of an end section of the valve pin means.

11. A valve mechanism according to claim 8, wherein an end section of the valve pin means is provided with two longitudinal grooves.

12. A valve mechanism according to claim 11, wherein the longitudinal grooves are disposed diametrically opposite.

13. A valve mechanism according to claim 12, wherein the arms of the star-shaped end sections of the valve pin means are substantially symmetrically disposed about the circumference.

14. A valve mechanism according to claim 1, wherein the valve channel is arranged in the uppermost portion of the operating piston in an inclined position of the operating cylinder when installed in a vehicle.

15. A valve mechanism according to claim 1, characterized by a star-shaped cross section of an end section of the valve pin means.

16. A valve mechanism according to claim 15, wherein the arms of the star-shaped end sections of the valve pin means are substantially symmetrically disposed about the circumference.

17. A valve mechanism according to claim 1, wherein an end section of the valve pin means is provided with two longitudinal grooves.

18. A valve mechanism according to claim 17, wherein the longitudinal grooves are disposed diametrically opposite.

References Cited
UNITED STATES PATENTS

| | | | |
|---|---|---|---|
| Re. 24,006 | 5/1955 | Acton | 91—401 |
| 3,023,740 | 3/1962 | Samuel, Jr., et al. | 91—401 |
| 3,118,349 | 1/1964 | Combs | 91—401 |
| 3,208,469 | 9/1965 | Gravert | 91—401 |
| 3,315,570 | 4/1967 | Brewer et al. | 91—401 |

FOREIGN PATENTS

| | | | |
|---|---|---|---|
| 26,023 | 8/1910 | Great Britain | 91—401 |

PAUL E. MASLOUSKY, Primary Examiner